United States Patent
Zeller et al.

(10) Patent No.: US 9,310,467 B2
(45) Date of Patent: Apr. 12, 2016

(54) SENSOR MOUNTING FOR A SENSOR FOR OBJECT DETECTION

(75) Inventors: Gerald Zeller, Ludwigsburg (DE); Andreas Busch, Laatzen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 157 days.

(21) Appl. No.: 14/125,034

(22) PCT Filed: Apr. 10, 2012

(86) PCT No.: PCT/EP2012/056410
§ 371 (c)(1),
(2), (4) Date: Feb. 26, 2014

(87) PCT Pub. No.: WO2012/167969
PCT Pub. Date: Dec. 13, 2012

(65) Prior Publication Data
US 2014/0224950 A1    Aug. 14, 2014

(30) Foreign Application Priority Data

Jun. 9, 2011 (DE) .......................... 10 2011 077 255

(51) Int. Cl.
*A47G 5/00* (2006.01)
*G01S 7/02* (2006.01)
(Continued)

(52) U.S. Cl.
CPC ................. *G01S 7/02* (2013.01); *G01S 7/4026* (2013.01); *G01S 13/931* (2013.01); *G01S 2007/027* (2013.01); *G01S 2007/4034* (2013.01);
(Continued)

(58) Field of Classification Search
CPC .......... G01S 7/4026; G01S 2007/4034; G01S 2007/403; G01S 13/931; G01S 13/9321; G01S 2013/9378; F16M 11/10; F16M 11/105; B60R 2011/0085

USPC ................. 343/880, 882; 342/75; 248/183.4, 248/292.12
See application file for complete search history.

(56) References Cited

U.S. PATENT DOCUMENTS 1,386,025 A * 8/1921 Pittman ................. F16M 11/10
                                            248/183.4
2,582,779 A * 1/1952 Hoge ..................... F16M 11/10
                                            248/183.4
(Continued)

FOREIGN PATENT DOCUMENTS

DE    1 723 804    6/1956
DE    33 09 685    9/1984
(Continued)

OTHER PUBLICATIONS

International Search Report for PCT/EP2012/056410, dated Jul. 13, 2012.

*Primary Examiner* — Christopher Garft
(74) *Attorney, Agent, or Firm* — Kenyon & Kenyon LLP

(57) ABSTRACT

A sensor mounting for a sensor for object detection includes a housing for the sensor, a holder on which the housing is pivotably held, an adjusting device for an angular orientation of the housing and an angular gear mechanism for controlling the adjusting device. The angular gear mechanism includes a drive wheel and a driven wheel, the drive wheel being connected to an engagement contour for the transmission of torque to the drive wheel, and a gear mechanism housing of the angular gear mechanism being set up so as to permit mounting of the drive wheel at different sides of the angular gear mechanism.

11 Claims, 2 Drawing Sheets

(51) Int. Cl.
  *G01S 7/40* (2006.01)
  *G01S 13/93* (2006.01)
(52) U.S. Cl.
  CPC . *G01S2013/9321* (2013.01); *G01S 2013/9375* (2013.01)

(56) References Cited

U.S. PATENT DOCUMENTS

| | | | | |
|---|---|---|---|---|
| 3,782,671 | A | * | 1/1974 | Igwe .................. F16M 11/10 248/183.4 |
| 4,941,672 | A | * | 7/1990 | Godin .................. B62D 7/1527 180/409 |
| 6,714,156 | B1 | | 3/2004 | Ibrahim et al. |
| 2003/0184471 | A1 | * | 10/2003 | Tohyama .............. G01S 7/4026 342/175 |
| 2004/0017308 | A1 | * | 1/2004 | Kikuchi ................ G01S 7/4026 342/74 |
| 2012/0086593 | A1 | * | 4/2012 | Weber .................. G01S 7/4026 342/146 |

FOREIGN PATENT DOCUMENTS

| | | |
|---|---|---|
| DE | 199 24 056 | 9/2000 |
| DE | 100 25 501 | 12/2001 |
| DE | 10 2008 045763 | 3/2010 |
| EP | 1 480 055 | 9/2002 |

* cited by examiner

SENSOR MOUNTING FOR A SENSOR FOR OBJECT DETECTION

CROSS REFERENCE TO RELATED APPLICATION

The present application is the national stage entry of International Patent Application No. PCT/EP2012/056410, filed on Apr. 10, 2012, which claims priority to Application No. DE 10 2011 077 255.3, filed in the Federal Republic of Germany on Jun. 9, 2011.

FIELD OF INVENTION

The present invention relates to a sensor mounting for a sensor for object detection, in particular for a radar sensor. In particular, the present invention relates to a sensor mounting for a sensor for object detection for motor vehicles, in particular for driver assistance systems. In addition, the present invention relates to a sensor unit having a sensor mounting, and to an assembly kit for a sensor mounting.

BACKGROUND INFORMATION

Radar sensors are used in motor vehicles for distance measurement and/or speed measurement of objects. For example, driver assistance systems are known in the form of travel speed regulators for motor vehicles having a radar system for locating a vehicle traveling in front and for measuring the distance therefrom. Such a distance regulating system is also referred to as an ACC system (Adaptive Cruise Control).

In order to ensure the proper functioning of radar sensors, after being mounted in the vehicle they must be oriented toward the roadway, or toward the desired region of detection, within specified limits. For example, for a radar sensor for a system for adaptive travel speed regulation, standardly an orientation of a main direction of radiation of the radar sensor at a precisely defined angle to the vehicle longitudinal axis is required, for example parallel to the vehicle longitudinal axis. Through such an orientation, it is possible to compensate, for example, manufacturing-related tolerances of the mechanical components of the radar sensor, as well as tolerances in the fastening to the motor vehicle.

For a radar sensor for object detection, in particular an orientation or adjustment of an angle of inclination of a main direction of radiation of the radar sensor is important. This angle is also referred to as elevation.

Adjusting devices are known for adjusting a radar sensor in the vertical direction, i.e., with regard to the elevation angle, in which an adjusting screw can be used to modify the angle of inclination of the radar sensor.

SUMMARY

In known adjusting devices for motor vehicle radar sensors, in which an adjustment takes place via a rotational movement of an adjusting screw, in order to make the adjustment this screw must be accessible at the location of installation in the motor vehicle. This accessibility must correspondingly be provided in the construction of the radar sensor and/or in the design of the area in which it is installed. For different installation situations, therefore, it may be necessary to redesign a radar sensor or its mounting device.

An object of the present invention is to create a sensor mounting having an adjusting device for a sensor for object detection that enables different adjustment designs.

The object is achieved by a sensor mounting for a sensor for object detection having a housing for the sensor, a holder on which the housing is pivotably held, an adjusting device for an angular orientation of the housing, and an angular gear mechanism for controlling the adjusting device, the angular gear mechanism having a drive wheel and a driven wheel, the drive wheel being connected to an engagement contour for the transmission of torque to the drive wheel, and a gear mechanism housing of the angular gear mechanism being set up so as to permit installation of the drive wheel at different sides of the angular gear mechanism.

In this way, in a situation of installation having a specified orientation of the sensor housing, it is easy to provide the possibility of adjustment at the corresponding side by installing the drive wheel at one of the different sides. A particular advantage of this adjustment design is that an adjustment of the sensor at a desired side can be provided without making constructive changes to the components of the sensor mounting.

Preferably, the drive wheel can be mounted at a plurality of positions, angle-offset from one another, on the circumference of the driven wheel. In this way, in particular in the case of an angular gear mechanism having a drive wheel and driven wheel a mounting of the drive wheel at various circumferential positions of the driven wheel can be provided in a particularly easy manner.

In particular, the gear mechanism housing can permit a mounting of the drive wheel at different sides of the angular gear mechanism, in each case in a position in which the drive wheel stands in engagement with the driven wheel and the engagement contour is situated on an outer side of the gear mechanism housing. In this way, the engagement contour can be situated on the corresponding side so as to be accessible.

Preferably, the gear mechanism housing has a first housing part and a second housing part, and the drive wheel is situated between the first housing part and the second housing part. In this way, for example the drive wheel can be situated at the desired side during installation of the gear mechanism housing in a particularly simple manner. The second housing part is for example connected to the holder via the first housing part. The first housing part is for example connected to the holder.

Preferably, the gear mechanism housing forms a bearing for the drive wheel, particularly preferably a sliding bearing. For example, the first housing part and/or the second housing part can have at least one receptacle for bearing the drive wheel.

Preferably, the second housing part has a receptacle for bearing the drive wheel, and a gear mechanism housing is set up so as to permit an installation of the second housing part with receptacle positioned at different sides of the angular gear mechanism. For example, the second housing part can be capable of being mounted on the first housing part in various positions in which the receptacle is positioned at, in each case, different sides of the angular gear mechanism. Thus, for example the first housing part can be situated in a specified position relative to the holder, while for example the second housing part permits an adaptation of the gear mechanism housing to the different installation positions of the drive wheel.

Preferably, the angular gear mechanism is a bevel gear mechanism. Particularly preferably, the drive wheel and the driven wheel are meshed bevel gears. In this way, a particularly precise transmission of torque can take place.

In a preferred exemplary embodiment, the adjusting device has a rotatable disk that can be controlled by the angular gear mechanism, the disk having a guide link running in a spiral shape in which there engages a radially movable pin. This enables a large gear reduction, as well as self-locking of the adjusting device. Moreover, it is particularly advantageous that in a very small space the rotational movement of the driven wheel can be converted into a radial movement of the pin. For example, the pin works together with the guide link such that when the rotation of the disk forces a relative movement between the disk and the pin, the pin is controlled in the radial direction.

The disk can for example be connected to the driven wheel, in particular connected in one piece. For example, a first side of the disk can have the guide link, and a second side of the disk can form the driven wheel.

The pin is preferably coupled to the housing. For example, the pin is situated on the housing. For example, the pin can be connected fixedly to the housing.

In addition, the object is achieved by an assembly kit for a sensor mounting of the type described, in which the drive wheel can be mounted at different sides of the angular gear mechanism. In particular, preferably the drive wheel can be mounted at different sides of the angular gear mechanism in each case in a position in which it stands in engagement with the driven wheel, and the engagement contour is situated on an outer side of the gear mechanism housing. The assembly kit can for example include the drive wheel and the above-named second housing part, the drive wheel being capable of being mounted between a first housing part and the second housing part of the gear mechanism housing.

In the following, a preferred exemplary embodiment of the present invention is explained in more detail with reference to the accompanying drawings.

DETAILED DESCRIPTION

Figure 1:
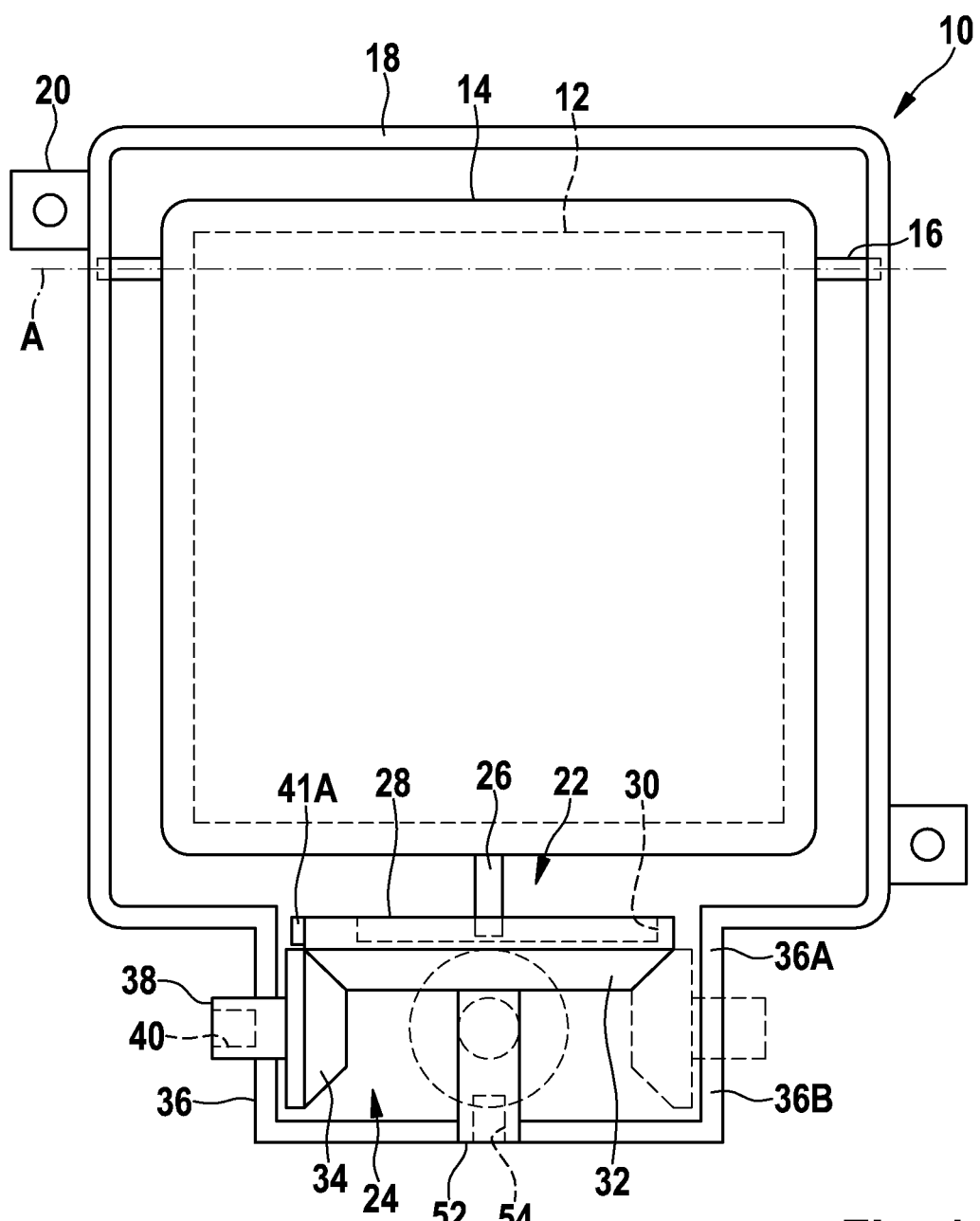
FIG. 1 shows a schematic representation of a front view of a radar sensor having a sensor mounting according to the present invention.

FIG. 1 shows a sensor unit having a sensor mounting 10 and a radar sensor 12 that has a housing 14. Radar sensor 12 is a radar sensor for a driver assistance system of a motor vehicle, in particular for a driving speed regulator.

Sensor housing 14 is pivotably suspended, by pins 16, on a holder 18 of sensor mounting 10. Holder 18 forms a frame that runs around housing 14. The frame has side parts that are connected to one another above and/or under the housing, and on which sensor housing 14 is suspended. In the front view shown in FIG. 1, the main direction of radiation of radar sensor 12 runs out from the plane of the drawing. Housing 14 is pivotable about a horizontal transverse axis A. At the location of installation in a motor vehicle, the sensor mounting is mounted on the motor vehicle by fastening holder 18 to the motor vehicle, for example using fastening devices 20, situated on holder 18, in the form of fastening clips.

When radar sensor 12 situated in housing 14 pivots about pivot axis A, the angle of inclination of the main direction of radiation of the radar sensor changes relative to the horizontal. In order to adjust this angular orientation, sensor mounting 10 has an adjusting device 22 that is controlled via an angular gear mechanism 24.

Adjusting device 22 includes a pin 26 that stands out from housing 14 at a side of housing 14, and is fixedly connected thereto. Pin 26 extends in a direction that is transverse to pivot axis A of housing 14 and transverse to the main direction of radiation of radar sensor 12. In the vertical direction, pin 26 is situated at a distance from pivot axis A.

Figure 2:
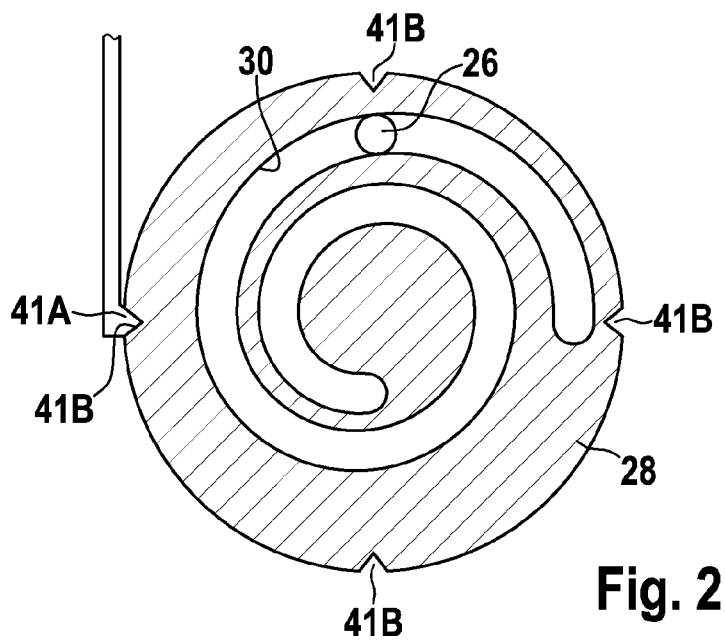
FIG. 2 shows a cross-sectional view of a guide link and of a pin of an adjusting device of the sensor mounting.

Adjusting device 22 further includes a rotatably mounted disk 28 that is rotatable about an axis of rotation running transverse to the main direction of radiation of radar sensor 12 and to pivot axis A of housing 14. On a side facing pin 26, disk 28 has a guide link 30, running in the shape of a spiral, for pin 26, as shown schematically in FIG. 2. Pin 26 engages without play in guide link 30. In this way, when disk 28 is motionless, the position of pin 26 is defined, so that the angular orientation of housing 14 about its pivot axis is defined, and thus the main direction of radiation of radar sensor 12 has a particular angular position relative to the horizontal. When disk 28 is rotated into a different position, pin 26 guided in guide link 30 then moves into a different radial position relative to disk 28, and at the same time pivots housing 14 about its pivot axis. This is because pin 26 is movable only in the radial direction relative to disk 28, due to the suspension of housing 14 on holder 18.

Thus, pin 26 works together with guide link 30 such that when there is a relative movement, forced by rotation of disk 28, between disk 28 and pin 26, pin 26 is controlled in the radial direction and housing 14 is pivoted about its pivot axis. Pin 26, guide link 30, and the suspension of housing 14 on holder 18 thus form a mechanism for converting a rotational movement of disk 28 into a pivot movement of housing 14 about a horizontal pivot axis. Due to the spiral-shaped course of guide link 30, there results a strong gear reduction as well as self-locking of the adjusting device. This enables a fine adjustment of the inclination of the main direction of radiation of radar sensor 12.

On the side facing away from pin 26, disk 28 forms a gear in the form of a bevel gear of angular gear mechanism 24. The bevel gear represents a driven wheel 32 of angular gear mechanism 24. Driven wheel 32 works together with a second bevel gear that forms a drive wheel 34 of angular gear mechanism 24. Intermeshed drive and driven wheels 34, 32 have axes that stand at an angle of 90° to one another. The diameter of driven wheel 32 is greater than the diameter of drive wheel 34, so that a further gear reduction results. Drive wheel 34 is mounted rotatably on a side wall of a gear mechanism housing 36.

An axial pin 38 of drive wheel 34 has an engagement contour 40 for the immediate transmission of torque to drive wheel 34. Engagement contour 40 is free at a side of gear mechanism housing 36. Engagement contour 40 is for example an insertion attachment for a screwdriver or screw wrench. Engagement contour 40 can for example include an inner hexagonal profile.

Driven wheel 32 is also mounted rotatably on gear mechanism housing 36. Drive wheel 34 and driven wheel 32 mesh with one another and form a gear mechanism without play, in the form of a bevel gear mechanism.

By rotating drive wheel 34, for example using a screwdriver, driven wheel 32 is at the same time rotated with disk 28, so that pin 26 is moved radially and housing 14 is pivoted.

A locking hook 41A situated on a flexible arm is situated alongside disk 28, and lies against the circumferential edge of disk 28. Locking hook 41A is connected to gear mechanism housing 36 via the arm. Disk 28 has locking indentations 41B on its circumference, at regular intervals. Locking indentations 41B permit locking hooks 41A to lock in. For example, a rotation of driven wheel 32, and thus of disk 28, from one locking indentation 41B to the next corresponds in each case to a pivoting of the housing by 0.5°. Thus, the locking device formed by locking hook 41A and locking indentations 41B brings about a perceptible locking of the angular gear mechanism at angular orientations of the housing spaced at regular angular intervals of 0.5°. The locking device situated on the driven wheel enables a "blind" adjustment to be carried out. Such a locking device can also be situated on the drive wheel or at a different location of the angular gear mechanism.

As described in the following, gear mechanism housing 36 is set up to permit a mounting of drive wheel 34 on different sides of angular gear mechanism 24.

Gear mechanism housing 36 has a first housing part 36A and a second housing part 36B. First housing part 36A is fixedly connected to holder 18, and forms a bearing for driven wheel 32. Second housing part 36B forms a cap of the gear mechanism housing and can be placed onto first housing part 36A. It is then connected to holder 18 via first housing part 36A.

Figure 3:
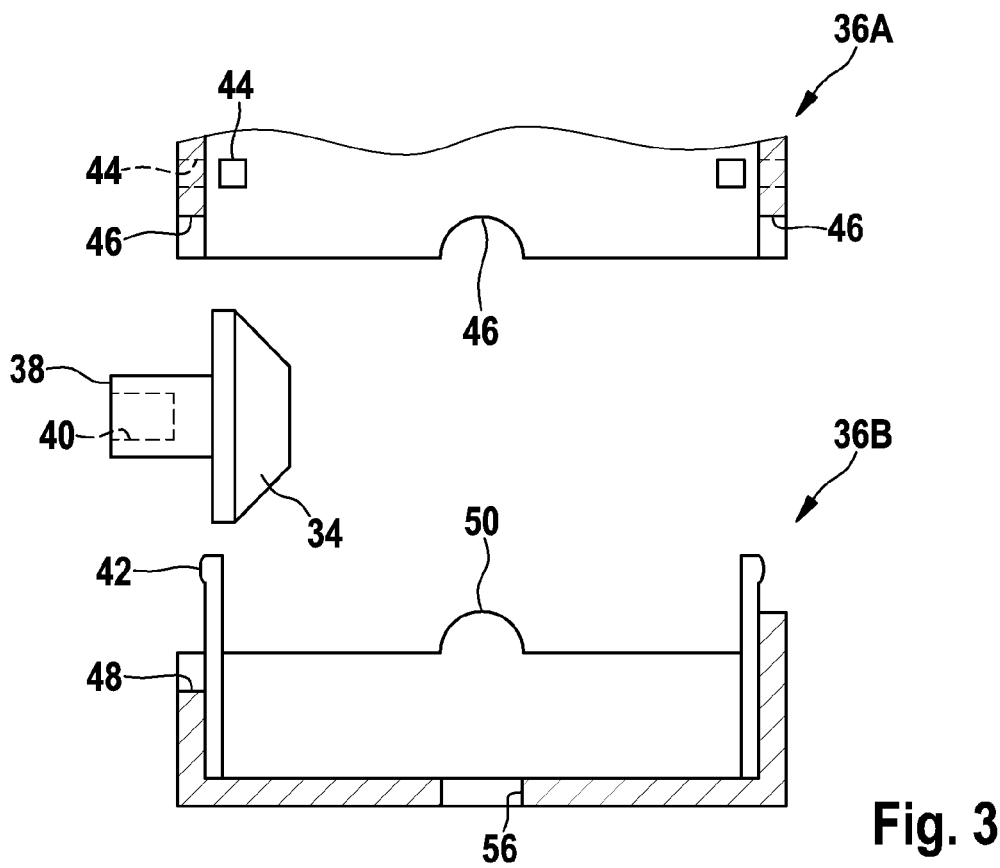
FIG. 3 shows a schematic view of first and second housing parts and of a drive wheel of an angular gear mechanism of the sensor mounting.

FIG. 3 schematically shows drive wheel 34 and first and second housing parts 36A, 36B, before installation. For example, an assembly kit for sensor mounting 10 can include second housing part 36B, detached from first housing part 36A or detachably connected thereto. Second housing part 36B can be mounted on first housing part 36A for example using fastening devices 42, 44 in the form of locking devices. FIG. 3 schematically shows locking dogs 42 and corresponding engagement contours 44 that work together therewith. For example, second housing part 36B can be clipped onto first housing part 36A.

In the mounted position shown in FIG. 1, second housing part 36B is detachably connected to first housing part 36A by fastening devices 42, 44. Here, drive wheel 34 is situated between first and second housing parts 36A, 36B. First housing part 36A has, at four positions offset by angles of 90°, receptacles 46 for mounting drive wheel 34 at four different sides of the gear mechanism housing. In this way, drive wheel 34 can be mounted at the corresponding positions offset by 90° on the circumference of driven wheel 32. In FIG. 1, drive wheel 34 is mounted on a left side, and alternative mounting positions are shown in broken lines.

In the described example, second housing part 36B has only a single receptacle 48 for bearing drive wheel 34. Receptacles 46, 48 each for example form a half bearing shell for an axial pin of drive wheel 34. At the other sides, second housing part 36B is provided with tongues 50 that, when mounted on first housing part 36A, close receptacles 46, which are not required. Depending on the desired position of drive wheel 34, second housing part 36B is mounted on first housing part 36A in a correspondingly oriented position. In this way, gear mechanism housing 36 is set up to permit a mounting of second housing part 36B with receptacle 48 positioned at different sides of angular gear mechanism 24. By correspondingly mounting the angular gear mechanism, the sensor mounting can be configured for example so that it can be adjusted from the left, from the right, from the front, or from the rear.

In addition, an axial pin 52 of driven wheel 32 is connected to an engagement contour 54 for the immediate transmission of torque to driven wheel 32. Second housing part 36B has an opening 56 through which axial pin 52 is led, so that engagement contour 54 is free. In the position shown in FIG. 1, an adjustment from below is thus additionally enabled, by transmitting a torque directly to driven wheel 32 via engagement contour 54.

In the described adjustment design, an adjustment of sensor 12 is therefore possible from various sides without requiring constructive modifications. Rather, using the same components, during the installation of the sensor mounting it can be determined at which side the engagement contour for torque transmission is to be made accessible. Good adjustability results from the self-locking and gear reduction of the adjusting device and angular gear mechanism.

What is claimed is:

1. A sensor mounting for a sensor for object detection, comprising:
    a housing for the sensor,
    a holder on which the housing is pivotably held,
    an adjusting device adapted to adjust an angular orientation of the housing, and
    an angular gear mechanism adapted for controlling the adjusting device, the angular gear mechanism having a drive wheel and a driven wheel, the drive wheel being connected to an engagement contour for transmission of torque to the drive wheel, and a gear mechanism housing of the angular gear mechanism being adapted to permit installation of the drive wheel at different sides of the angular gear mechanism.

2. The sensor mounting according to claim 1, wherein the drive wheel can be installed at a plurality of positions, offset from one another angularly, on a circumference of the driven wheel.

3. The sensor mounting according to claim 1, wherein the gear mechanism housing has a first housing part and a second housing part, and the drive wheel is situated between the first housing part and the second housing part.

4. The sensor mounting according to claim 3, wherein the second housing part has a receptacle for bearing the drive wheel, and the gear mechanism housing is adapted to permit an installation of the second housing part with the receptacle positioned at different sides of the angular gear mechanism.

5. The sensor mounting according to claim 1, wherein the drive wheel and the driven wheel are toothed gears.

6. The sensor mounting according to claim 1, wherein the angular gear mechanism is a bevel gear mechanism.

7. The sensor mounting according to claim 1, wherein the driven wheel is connected to an engagement contour for transmission of torque to the driven wheel.

8. The sensor mounting according to claim 1, wherein the adjusting device has a rotatable disk that can be controlled by the angular gear mechanism and that has a guide link that runs in a shape of a spiral, in which a radially movable pin engages.

9. The sensor mounting according to claim 1, wherein the angular gear mechanism has a locking device that is adapted to bring about a locking of the angular gear mechanism at different angular orientations of the housing, spaced at regular angular intervals from one another.

10. A sensor unit, comprising:
    a sensor mounting, comprising:
        a housing,
        a holder on which the housing is pivotably held,
        an adjusting device adapted to adjust an angular orientation of the housing, and
        an angular gear mechanism adapted for controlling the adjusting device, the angular gear mechanism having a drive wheel and a driven wheel, the drive wheel being connected to an engagement contour for transmission of torque to the drive wheel, and a gear mechanism housing of the angular gear mechanism being adapted to permit installation of the drive wheel at different sides of the angular gear mechanism; and
    a sensor for object detection situated in the housing of the sensor mounting.

11. An assembly kit, comprising:
a sensor mounting for a sensor for object detection, comprising:
   a housing for the sensor,
   a holder on which the housing is pivotably held,
   an adjusting device adapted to adjust an angular orientation of the housing, and
   an angular gear mechanism adapted for controlling the adjusting device, the angular gear mechanism having a drive wheel and a driven wheel, the drive wheel being connected to an engagement contour for transmission of torque to the drive wheel, and a gear mechanism housing of the angular gear mechanism;
wherein the drive wheel is mountable at different sides of the angular gear mechanism.

* * * * *